United States Patent
Yang et al.

(10) Patent No.: US 9,648,640 B2
(45) Date of Patent: May 9, 2017

(54) METHOD FOR RANDOM ACCESS

(75) Inventors: Tao Yang, Shanghai (CN); Seau Sian Lim, Swindon (GB)

(73) Assignee: Alcatel Lucent, Boulogne-Billancourt (FR)

(*) Notice: Subject to any disclaimer, the term of this patent is extended or adjusted under 35 U.S.C. 154(b) by 270 days.

(21) Appl. No.: 14/009,035

(22) PCT Filed: Mar. 30, 2012

(86) PCT No.: PCT/IB2012/000901
§ 371 (c)(1),
(2), (4) Date: Sep. 30, 2013

(87) PCT Pub. No.: WO2012/137077
PCT Pub. Date: Oct. 11, 2012

(65) Prior Publication Data
US 2014/0023052 A1    Jan. 23, 2014

(30) Foreign Application Priority Data
Apr. 2, 2011    (CN) .......................... 2011 1 0089953

(51) Int. Cl.
*H04W 74/08* (2009.01)
*H04W 56/00* (2009.01)
*H04L 5/00* (2006.01)

(52) U.S. Cl.
CPC ....... *H04W 74/0833* (2013.01); *H04W 74/08* (2013.01); *H04L 5/0007* (2013.01); *H04L 5/0091* (2013.01); *H04W 56/0045* (2013.01)

(58) Field of Classification Search
CPC ............. H04W 74/0833; H04W 74/08; H04W 56/0045; H04L 5/0007; H04L 5/0091
See application file for complete search history.

(56) References Cited

U.S. PATENT DOCUMENTS

2011/0045837 A1    2/2011  Kim et al.
2011/0294508 A1*   12/2011  Min et al. ..................... 455/436
(Continued)

FOREIGN PATENT DOCUMENTS

CN    101388722 A    3/2009
CN    101562884 A    10/2009
(Continued)

OTHER PUBLICATIONS

International Search Report for PCT/IB2012/000901 dated Sep. 27, 2012.
(Continued)

*Primary Examiner* — Mohammad Anwar
(74) *Attorney, Agent, or Firm* — Fay Sharpe, LLP

(57) ABSTRACT

The present invention proposes a method, in an eNB in wireless communication network based on carrier aggregation (CA) transmission, for controlling random access performed by UE, wherein the method comprises: determining whether the UE is out of UL sync on all cells, wherein the cells comprises Pcell and Scell: sending Physical Downlink Control Channel (PD-CCH) order signaling if the UE is out of UL sync on all the cells, wherein the PDCCH order signaling is used to indicating the UE to perform random access. A method, in a mobile station in wireless communication network based on carrier aggregation (CA) transmission, for random access, wherein the mobile station is configured a Pcell and at least one Scell, and the method comprises: determining whether random access is needed on at least one cell of the cells, wherein the cells comprises the Pcell and the at least one Scell; performing random access on at least one cell of all the cells, if it is determined that random access is needed on at least one cell of the cells.

10 Claims, 1 Drawing Sheet

(56) References Cited

U.S. PATENT DOCUMENTS

| | | | |
|---|---|---|---|
| 2012/0063425 A1 | 3/2012 | Wang et al. | |
| 2012/0257570 A1* | 10/2012 | Jang et al. | 370/328 |
| 2012/0300714 A1* | 11/2012 | Ng et al. | 370/329 |
| 2013/0188620 A1* | 7/2013 | Dinan | 370/336 |

FOREIGN PATENT DOCUMENTS

| | | |
|---|---|---|
| CN | 101873711 A | 10/2010 |
| CN | 101888648 A | 11/2010 |
| CN | 101911543 A | 12/2010 |
| CN | 101969697 A | 2/2011 |
| CN | 101998661 A | 3/2011 |
| EP | 2 037 648 A2 | 3/2009 |
| EP | 2264936 A2 | 2/2010 |
| EP | 2197231 A2 | 6/2010 |
| JP | 2013-516917 A | 5/2013 |
| JP | 2013-520065 A | 5/2013 |
| JP | 2013-528968 A | 7/2013 |
| JP | 2013-545329 A | 12/2013 |
| WO | 2011/018042 A1 | 2/2011 |
| WO | 2011/032308 A1 | 3/2011 |
| WO | 2012/042736 A1 | 4/2012 |

OTHER PUBLICATIONS

NTT Docomo, Inc., "RACH for data resuming during CA", R2-102492, 3GPP TSG-RAN WG2 #69bis, Beijing, China, Apr. 12-16, 2010, pp. 1-3.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)", 3GPP TS 36.300, V10.2.0 (Dec. 18, 2010), pp. 1-200.

Samsung, "Discussion on TAT expiry", 3GPP TSG-RAN2#71bis meeting, Xian, China, Oct. 11-15, 2010, Tdoc R2-105401, Agenda Item: 7.1.1.3, Document for: Discussion/Decision, 3 pages.

* cited by examiner

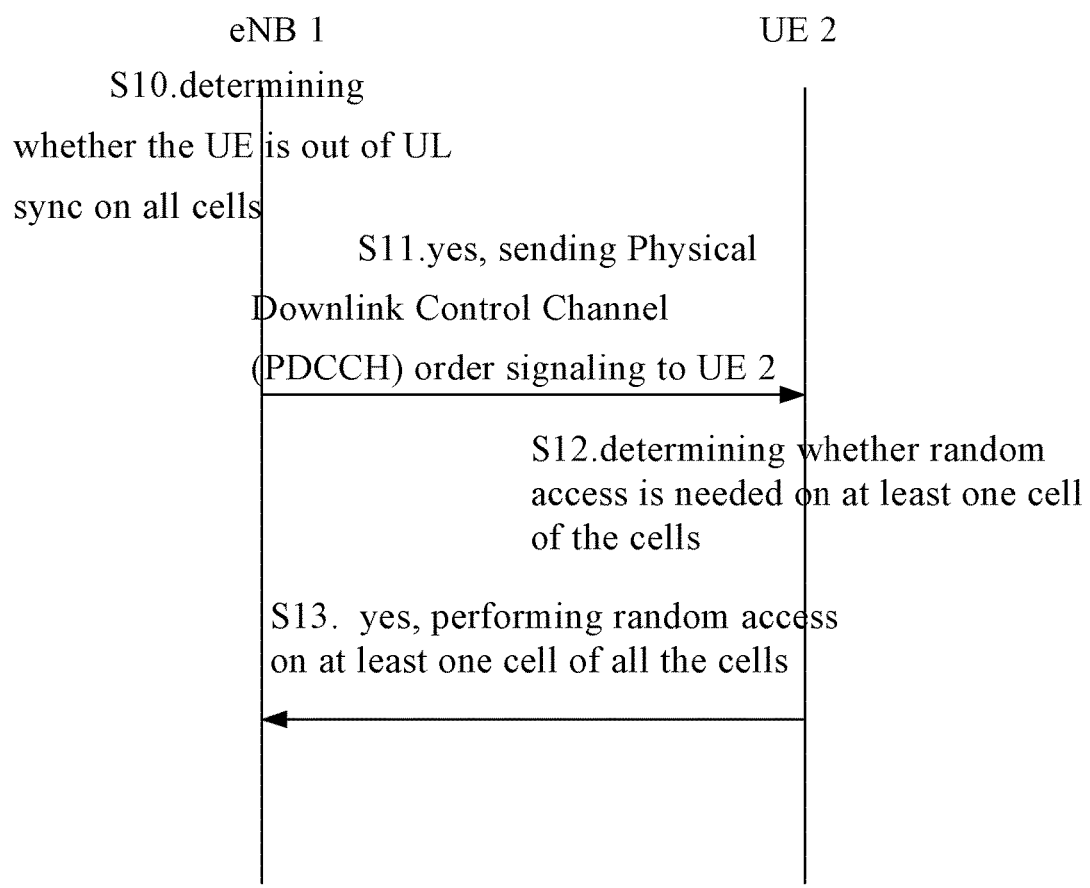

METHOD FOR RANDOM ACCESS

FIELD OF THE INVENTION

The present invention relates to wireless communication based on carrier aggregation (CA) transmission, more particularly, to a method for random access performed by UE and a method in an eNB for indicating UE to perform random access.

BACKGROUND OF THE INVENTION

An UE can make UL feedback correctly only when it synchronizes its UL transmission time; therefore, UE has to set up UL sync for receiving DL data from eNB. Otherwise, UE should set up UL sync with the eNB, if it wants to transmit UL data to an eNB.

In RAN51, it was agreed to support the possibility for multiple timing alignment/advance for UL CA in the case of non-collocated site (e.g. Remote Radio Head, RRH) and frequency repeater scenarios. It is supported to transmit signaling and data on several carrier between eNB and UE, according to different UL time, the component carrier that the UE first access successfully is called Pcell (Primary Cell), and other alternative component carriers are called Scell (Secondary Cell). Of course, UE can change the choose of Pcell and Scell correspondingly according to the trigger of eNB. For timing alignment, e.g. UL timing alignment (adapting the UL time), timer advance is used on the UE to offset time delay.

For R10 of 3GPP (Third Generation Partnership Program), UE can only perform random access on Pcell (via PRACH (Physical Random Access Channel)). Because all Scells share one TA value (timing advance value) with Pcell, when UL synchronization for UE's Pcell is missed, UL synchronization for all UE's cells is missed. Therefore, e.g. when DL data arrival but UL synchronization for Pcell is missed, PDCCH (Physical Downlink Control Channel) order signaling is only sent on Pcell by eNB. The PDCCH order signaling comprises a dedicated preamble, known as random access preamble, which is used to indicate the UE to perform contention-free random access. Next, UE will perform random access on Pcell to resume the UL synchronization, after receiving the PDCCH order from eNB. If random access on Pcell is failed, UE will trigger RRC (Radio Resource Control) re-connection procedure.

SUMMARY OF THE INVENTION

In R11 of 3GPP, multiple TAs are supported, and TA value on UE's Pcell can be different from that on Scell. Therefore, when UL synchronization for UE's Pcell is missed, it doesn't mean that UL synchronization for all UE's cells is missed. Thus, besides random access on Pcell, UE should also perform random access on corresponding Scells when it is necessary, to get appropriate TA, before any UL transmission can occur is on them.

Taking into account UE's capability of random access on multiple cells, it is irrational that PDCCH order information and random access is limited on Pcell, according to the present R10 of 3GPP. Therefore, the present invention proposes a new solution for UE to perform random access and eNB to give corresponding indication.

According to the first aspect of the present invention, there provides a method, in an eNB in wireless communication network based on carrier aggregation (CA) transmission, for controlling random access performed by UE, wherein the method comprises: determining whether the UE is out of UL sync on all cells, wherein the cells comprises Pcell and Scell; sending PDCCH order signaling if the UE is out of UL sync on all the cells, wherein the PDCCH order signaling is used to indicating the UE to perform random access.

According to the second aspect of the present invention, there provides a method, in a mobile station in wireless communication network based on CA transmission, for random access, wherein the mobile station is configured a Pcell and at least one Scell, and the method comprises: determining whether random access is needed on at least one cell of the cells, wherein the cells comprises the Pcell and the at least one Scell; performing random access on at least one cell of all the cells, if it is determined that random access is needed on at least one cell of the cells.

According to the third aspect of the present invention, there provides a method, in eNB of wireless communication network based on CA transmission, for controlling RRC reconnection performed by UE, wherein the method comprises: receiving the random access procedure on Scell from the UE; determining whether the UE needs RRC reconnection; sending the indicating information of initiating RRC reconnection to the UE, if RRC reconnection is needed.

With the solution in the present invention, it reduces the possibility of RRC reconnection, and thereby reduces the probability of clearing is memory and data missing.

BRIEF DESCRIPTION OF DRAWINGS

With reference to the appended drawings and the following detailed description of the non-restrictive embodiments, other features, objects and advantages of the present invention will be more apparent.

The FIGURE shows a system flowchart of one embodiment of the present invention.

Wherein same or similar reference signs of appended drawings, refer to same or similar step features or apparatuses/modules.

DETAILED DESCRIPTION OF EMBODIMENTS

The FIGURE shows a system flowchart of one embodiment of the present invention. Wherein data and signaling transmission of both eNB 1 and UE 2 are based on CA transmission.

Detail description is made of one illustration of the present invention. In the embodiment, the process that eNB 1 triggers a random access procedure of UE 2 is described.

First, in step S10, eNB 1 determines whether UE 2 is out of UL sync on all cells, wherein the cells comprises Pcell and Scell.

Specifically, eNB 1 determines whether the UE is out of UL synchronization on all the cells, according to the UE's TA value in each cell and the working state of the corresponding TAT (time advance timer). Besides, eNB 1 needs to determine whether DL data arrivals at UE 2, or whether initial UL synchronization configuration on Scell. If eNB determines UL synchronization on all the cells in missed, and DL data arrivals at UE 2, or the eNB determines UL synchronization on all the cells in missed, and Scell of UE 2 needs initialing UL synchronization configuration, eNB 1 determines it is needed to send PDCCH order signaling to UE.

Next, in step S11, eNB 1 sends PDCCH order signaling to UE 2 if UE 2 is out of UL sync on all the cells, wherein the PDCCH order signaling is used to indicating the UE to perform random access.

Specially, there comprises the following cases of the UL synchronization on UE 2's cells with eNB 1.

Case 1:

If eNB 1 determines that UE 2's Pcell is in sync with eNB 1, at least one Scell (including all Scells) is out of sync with eNB 1, eNB 1 does not need to send PDCCH order because UL feedback can be transmitted on Pcell, e.g. HARQ ACK/NACK feedback.

Case 2:

If eNB 1 determines that UE 2's Pcell is out of sync with eNB 1, while at least one Scell (including all Scells) is sync with eNB 1, e.g. TAT of Pcell is expired and TAT of other Scells is working, eNB 1 may change Pcell via handover or non-handover, and then choose one Scell as a new Pcell.

For the above cases, eNB 1 does not need to send PDCCH order to UE 2 if there's one cell, no matter Pcell or Scell, is UL sync with eNB 1.

Case 3:

eNB 1 sends PDCCH order to resume UL synchronization only when all the cells are out of UL sync, e.g. TATs of all cells are expired, and DL data arrivals on UE 2. PDCCH order can be sent on any activated cell.

Specially, eNB 1 can further determine whether UE 2 need to perform random access on a specific cell or all cells according to implementation of eNB, if eNB determines all cells of UE 2 are out of UL sync with eNB 1.

Case A: eNB 1 sends PDCCH order signaling to UE 2, when eNB 1 determines that UE 2 needs to perform random access on a specific cell. Wherein, the PDCCH order is used to indicate the UE to perform random access on the specific cell.

It is appreciated that the PDCCH order signaling triggers UE 2 to perform random access on a specific cell. Of course, eNB 1 can send several PDCCH order signalings to UE 2, wherein each PDCCH order signaling is indicates a different cell for UE's random access.

Specially, eNB 1 can indicate the specific cell to UE 2 via at least 2 ways.

Way 1: Explicit Indication

The indicating information of the specific cell for UE to perform random access can be included in CIF (Carrier Indication Field) of PDCCH order signaling sent to UE by eNB 1. E.g. the CIF indicates UE 2 to perform random access on Pcell. Or the CIF indicates UE 2 to perform random access on a specific Scell.

Way 2: Implicit Indication

Because each UL cell (or CC, Component Carrier) has a relevance to a DL cell (or CC, Component Carrier), the relationship is included in system information block 2 (SIB 2). The carrier of the PDCCH order signaling can make implicit indication to indicate of the specific cell for UE to perform random access, when indicating information is not included in PDCCH order signaling explicitly.

Case B: in another case, eNB 1 sends PDCCH order signaling to the UE, when eNB 1 determines that UE 2 need to perform random access on all cells, wherein the PDCCH order signaling is used to indicate the UE to perform random access on all the cells.

Specially, eNB 1 can send a PDCCH order signaling, wherein the PDCCH order signaling can trigger UE 2 to perform random access on all cells; or eNB 1 can send several PDCCH order signaling, wherein each PDCCH order signaling can trigger UE 2 to perform random access on one cell, and the several PDCCH order signalings trigger UE 2 to perform random access on all cells.

Besides, in the above cases A and B which indicate UE to perform random access on a specific cell or all cells, the PDCCH order signaling sent to UE 2 by eNB 1 can include dedicated random access preassemble, to indicate UE 2 to perform contention-free random access according to the dedicated random access preassemble. If the PDCCH order signaling sent to is UE 2 by eNB 1 does not include a dedicated random access preassemble, UE 2 need to perform contention-based random access.

Next, in step S12, UE 2 determines whether to perform random access on at least one cell of all cells, wherein all the cells comprise Pcell and at least one Scell. In the embodiment, UE 2 already received a PDCCH order signaling from eNB 1, therefore, UE 2 determines to perform random access on at least one cell of all the cells. Of course, UE 2 determines whether to perform random access on at least one cell of all cells is not limited to these, other conditions will be describe in the following embodiments.

Next, in step 13, UE performs random access on at least one cell of all the cells if it is needed.

Case A: specially, UE 2 performs random access on the specific cell indicated by the PDCCH order signaling, if the PDCCH order received by UE 2 from eNB 1 indicates a specific cell for UE to perform random access.

Specially, the PDCCH order received by UE 2 from eNB 1, which indicates a specific cell for UE to perform random access, comprises at least 2 ways to indicate the specific cell to UE 2.

Way 1: Explicit Indication

UE 2 performs random access on the specific cell indicated by the CIF, if CIF of a PDCCH order signaling sent to UE 2 by eNB 1 includes the indicating information of the specific cell for UE 2 to perform random access. E.g. UE 2 performs random access on Pcell, if the CIF indicates to perform random access on Pcell; UE 2 performs random access on the specific Scell, if the CIF indicates to perform random access on a specific Scell.

Way 2: Implicit Indication

Because each UL cell (or CC, Component Carrier) has a relevance to a DL cell (or CC, Component Carrier), the relationship is included in system information block 2. The UE can determine the UL cell corresponding to the DL cell that transmit the PDCCH, according to the DL cell that transmit the is PDCCH and the information in the system information block, and perform RACH on the determined UL cell, when indicating information is not included in PDCCH order signaling explicitly.

Case B: UE 2 performs random access on all the cells, if the PDCCH order signaling received from eNB 1 indicates UE 2 to perform random access on all cells.

Specially, UE 2 can perform random access in at least 2 ways.

Way B1: in a serial way, UE 2 performs random access on each cell separately, e.g. UE 2 first perform random access on Pcell, if the random access on the Pcell is failure, then perform random access on a Scell, if the random access on the Scell is failure, then perform random access on another Scell, in turns, until the random access on some Scell is successful, or until all the random access is failure.

Way B2: in a parallel way, UE 2 performs random access on each cell at the same time. Taking into account that carrier of each cell is different; therefore, UE can perform random access on different carriers at the same time.

An advantage of case B is, when DL data arrivals, several random access procedures are performed on each cell, and probability of RRC reconnection is reduced, and RRC reconnection means data missing, thus several random access procedure benefits to reducing the probability of data missing. E.g. eNB can determine to choose a Scell with UL sync to replace Pcell out of UL sync, when the random access is successful on a Scell instead of Pcell, and the random access is failure on Pcell. Therefore, there is no need to perform RRC reconnection or clear buffer, and clear buffer will lead to data missing.

Afterwards, UE 2 does not need to perform RRC reconnection with eNB 1, if random access is successful on at least one cell of all the cells, e.g. the random access performed by UE 2 is successful on a Scell.

In another embodiment, UE 2 does not need to perform RRC reconnection with eNB 1, if random access is successful on at least one cell is of all the cells, e.g. the random access performed by UE 2 is successful on a Scell, and afterwards UE 2 receives a indicating information from eNB which indicates to choose the Scell, on which the random access is successful, as the new Pcell.

Otherwise, eNB 1 sends indicating information of RRC reconnection to UE 2, if random access on all the cells is failed; or indicating information of RRC reconnection is received by UE 2 from the eNB, e.g. random access performed by UE 2 is successful on certain Scell but eNB 1 determines RRC reconnection performed by UE 2 is necessary according to some rules. Therefore, in step S14, UE 2 performs a RRC reconnection to the eNB. Besides, in cases A and B, UE 2 can perform contention-free random access according to the dedicated random access preamble, when the dedicated random access preamble is included in the PDCCH order signaling sent to UE 2 by eNB 1. UE 2 can perform contention-based random access, if the UE sends the dedicated random access preamble but the contention-free random access is failed. The UE initiates a RRC reconnection request to eNB 1, if the contention-based random access is failed again. Alternatively, UE 2 can initiate a RRC reconnection immediately, if contention-based random access is failed.

It indicates that UE 2 needs to perform contention-based random access, if a dedicated random access preamble is not included in the PDCCH order signaling sent to UE 2 by eNB 1.

The above is the description of the procedure that UE determines to perform random access, when a PDCCH order signaling sent by eNB 1 is received by UE 2; that is to say, the above embodiment describes UE's random access procedure triggered by eNB. The following will describe some other conditions that UE determines whether to perform random access, also known as random access procedure triggered by UE 2 itself.

In another embodiment, in step S12, UE 2 can determine to perform random access if initiating scheduling request to the eNB is failed.

Specially, SR (Scheduling Request) is configured to transmit on PUCCH (Physical Uplink Control Channel) on Pcell only.

UE 2 will perform random access procedure when the max number of scheduling request is attempted and failed, or there is no PUCCH resource on any TTI (Transport Time Interval) on Pcell.

Then, in step S13, UE 2 performs random access procedure on Scell, and it can use the method of performing random access on all the cells, therefore, the method of performing random access on all the cells is similar with UE's random access triggered by PDCCH order signaling sent by eNB, therefore it will not be repeated here.

In another embodiment, in step S12, UE 2 can determine to perform random access when wireless link to the eNB is failed.

Specially, DL RLF (Radio Link Failure) happens when RLM (Radio Link Management) detects some problem on physical layer, and triggers RRC reconnection after T311 is expired.

Then, in step S13, UE 2 performs random access on Scell, and it can use the method of performing random access on all the cells, therefore, the method of performing random access on all the cells is similar with UE's random access triggered by PDCCH order signaling sent by eNB, therefore it will not be repeated here.

Besides, in another embodiment, UE 2 determines to perform random access when UE is out of UL sync on all the cells, and UL data arrives at the UE.

Then, in step S13, UE 2 performs random access on Scell, and it can use the method of performing random access on all the cells, therefore, the method of performing random access on all the cells is similar with UE's random access triggered by PDCCH order signaling sent by eNB, therefore it will not be repeated here.

The advantage of performing random access on all the cells is that random access opportunity is increased while PRACH resource on each cell is not increased. Besides, comparing to the data loss caused by RRC reconnection, it can recover faster from SR failure or from wireless link is failure or resume UL sync and transmit UL data correctly.

Those skilled in the art can understand and carry out various modification or variation in the scope of specifications, public content and the appended drawings and claims. In claims, the word "comprise" doesn't exclude elements or steps; and "one" doesn't exclude plural. In a practical application of the present invention, a component can implement several functions of technical features referenced in claims. Any appended drawing marks in the claims should not be seen as limiting the claims involved.

The invention claimed is:

1. A method, in an eNB in wireless communication network based on carrier aggregation transmission, for controlling random access performed by UE, wherein the method comprises:
   determining whether the UE is out of UL sync on all cells, wherein the cells comprises Pcell and Scell;
   sending Physical Downlink Control Channel (PDCCH) order signaling if the UE is out of UL sync on all the cells, wherein the PDCCH order signaling is used to indicating the UE to perform random access;
   wherein the sending comprises:
     determining whether the UE needs to perform random access on a specific cell or on all the cells, according to predetermined rules, when the UE is out of UL sync on all the cells;
     sending a PDCCH order signaling to the UE, wherein the PDCCH order signaling is used to indicate the UE to perform random access on a specific cell, if the UE is determined to perform random access on a specific cell;
     sending a PDCCH order signaling to the UE, wherein the PDCCH order signaling is used to indicate the UE to perform random access on all the cells, if the UE is determined to perform random access on all the cells.

2. The method according to claim 1, wherein the determining comprises:
   determining whether the UE is out of UL sync on all the cells, according to the UE's timing advance value in each cell and the working state of the corresponding time advance timer.

3. The method according to claim 1, wherein sending is implemented as any one of the follows:
  sending a PDCCH order signaling to the UE, wherein the Carrier Indication Field of the PDCCH order signaling comprises the indicating information of the specific cell for the UE to perform random access; or
  sending a PDCCH order signaling to the UE, wherein the carrier of the PDCCH order signaling indicates the specific cell for the UE to perform random access.

4. A method, in a mobile station in wireless communication network based on carrier aggregation transmission, for random access, wherein the mobile station is configured a Pcell and at least one Scell, and the method comprises:
  determining whether random access is needed on at least one cell of the cells, wherein the cells comprises the Pcell and the at least one Scell;
  performing random access on at least one cell of all the cells, if it is determined that random access is needed on at least one cell of the cells;
  wherein the determining further comprises determining that random access is needed on a specific cell, when the UE receives the PDCCH order signaling from the eNB, and the PDCCH order signaling indicates the UE to perform random access on a specific cell, and the performing further comprises performing random access on the specific cell; and
  wherein the determining further comprises determining that random access is needed on all the cells, when the UE receives the PDCCH order signaling from the eNB, and PDCCH order signaling indicates UE to perform random access on all the cells, and the performing further com4rises performing random access on all the cells.

5. The method according to claim 4, wherein the method comprises the following:
  initiating radio resource connection (RRC) reconnection to eNB, if any of the following conditions is satisfied:
  random access on all the cells are failed;
  indicating information of RRC reconnection is received from the eNB.

6. The method according to claim 4, wherein the determining further comprises:
  determining random access is needed on at least one cell of the cells, if any of the following conditions is satisfied:
  scheduling request to the eNB is failed;
  wireless link to the eNB is failed;
  the UE is out of UL sync on all the cells, and UL data is arrived at the UE;
  the UE receives a Physical Downlink Control Channel order signaling from the eNB.

7. The method according to claim 6, wherein the determining further comprises:
  the UE receives the PDCCH order signaling from the eNB, and the PDCCH order signaling comprises a dedicated random access preamble;
  the performing further comprises: performing contention-free random access on at least one cell of the cells, according to the dedicated random access preamble.

8. The method according to claim 4, wherein the determining further comprises:
  determining the specific cell for random access, according to the indicating information of the specific cell for UE to perform random access, in the Carrier Indicator Field of the PDCCH order signaling;
  or determining the specific cell for random access, according to the carrier of the PDCCH order signaling and the content of system information block 2.

9. The method according to claim 4, wherein the performing further comprises: performing random access on all the cells in serial or in parallel.

10. A method, in eNB of wireless communication network based on carrier aggregation transmission, for controlling Radio Resource Control reconnection performed by UE, wherein the method comprises:
  receiving the random access procedure on Scell from the UE;
  determining whether the UE needs RRC reconnection;
  sending the indicating information of initiating RRC reconnection to the UE, if RRC reconnection is needed.

* * * * *